3,723,287
APPARATUS FOR PRODUCING ALUMINUM FROM ALUMINA
Charles Henry Elliott, 212 Jeff Davis Ave.,
Waveland, Miss. 39576
Filed Sept. 30, 1970, Ser. No. 76,915
Int. Cl. C22d 3/02, 3/12
U.S. Cl. 204—243 R  12 Claims

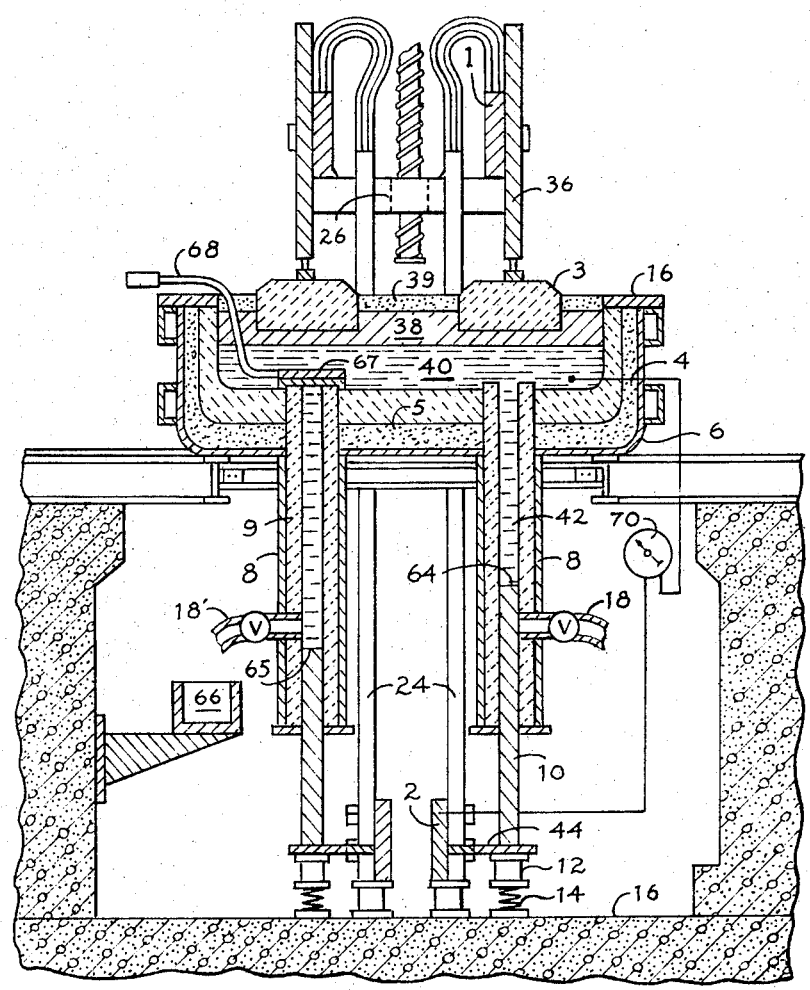
FIG. 2
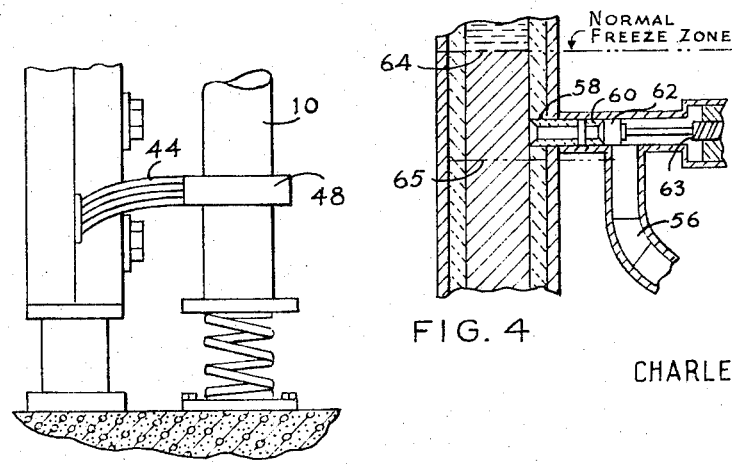
FIG. 3
FIG. 4
CHARLES HENRY ELLIOTT,
INVENTOR.

ABSTRACT OF THE DISCLOSURE

Apparatus for alumina reduction comprising substantially vertical cathodes, eliminating previous leaching of iron into the molten aluminum from horizontal cathodes in the crucible, and the previous wave-like distortions (ridging and motoring) of this aluminum caused by magnetic forces from the horizontal cathodes. The composite vertical cathode comprises: an outer steel tube, fixed to and extending below the crucible shell; an inner carbonaceous hollow member or conduit; a central, current-conducting means in the conduit that comprises a lower rod of conductive metal and a portion of the molten aluminum within an upper part of the conduit. A method is disclosed that comprises dropping a vertical rod of aluminum or copper downward in and thru the cathode hollow member, to rest on a resilient base. When this rod is aluminum it preferably extends well above an outlet tap in the conduit; when of copper its upper end is below the tap. The method also comprises withdrawing molten aluminum from the tap—optionally from the temporarily capped hollow member (in purging it of alumina sludge) or from the crucible (in withdrawing produced aluminum).

---

In the presently common type of aluminum oxide reduction, by the Hall-Heroult process, each reduction cell (pot) has imbedded in the bottom of its carbon lining numerous iron bars for conduction of electricity out of the cell. During use of this cell the iron of these bars leaches thru the carbon lining into the molten aluminum. And at a certain point in this contamination of the aluminum the cell must be relined.

These iron bars also are the principal cause of undesirable magnetic forces which give rise to wave-like distortions in the surface of the molten aluminum and motoring of it into rotary paths. Both this ridging and rotary motoring are detrimental to the process. They disturb the stable reactions between the anode and cathode and also cause carbon-sidewall erosion.

Moreover, the current has to pass thru the carbon lining to the iron bars, thus causing absorption of the cryolite by the carbon. This absorption, which can occur only when current flows thru the carbon, is expensive because of loss of cryolite and causes heaving and distortion of the lining. This defect commonly causes relining of the cell in an average of 1,000 days.

In the presently common cell there is a large voltage drop between the bottom of the molten aluminum and the bus that is outside the cell. This is because of the high resistance of the carbon lining and the imbedded iron bars.

In view of the above facts, an object of the present invention is to provide an alumina-reduction cell in which there are no magnetic forces.

Another object is to present a cell in which the path of electric current is vertical, thru vertical, all-aluminum cathode conductors.

Some of the other objects are to provide a cell in which: (1) there is no absorption of cryolite in the lining; (2) the cathode conductors comprise a graphite sleeve, molten aluminum in its top portion, and solidified aluminum in its lower portion.

Other objects of the invention will become apparent from the following specification and the accompanying drawings.

FIG. 2 is an elevational view in section from a plane comparable to the plane 2—2 in FIG. 1, showing a modified form of the composite cathodes.

FIG. 3 is a detail, sectional view of the base of the right-hand one of the cathodes shown in FIG. 2, illustrating, on a scale enlarged from that of FIG. 2, this base and its support and electrical connections.

FIG. 4 is a detail, sectional view of a middle portion of one of the cathodes and its valve for purging or tapping aluminum from the cathode.

Figure 1:
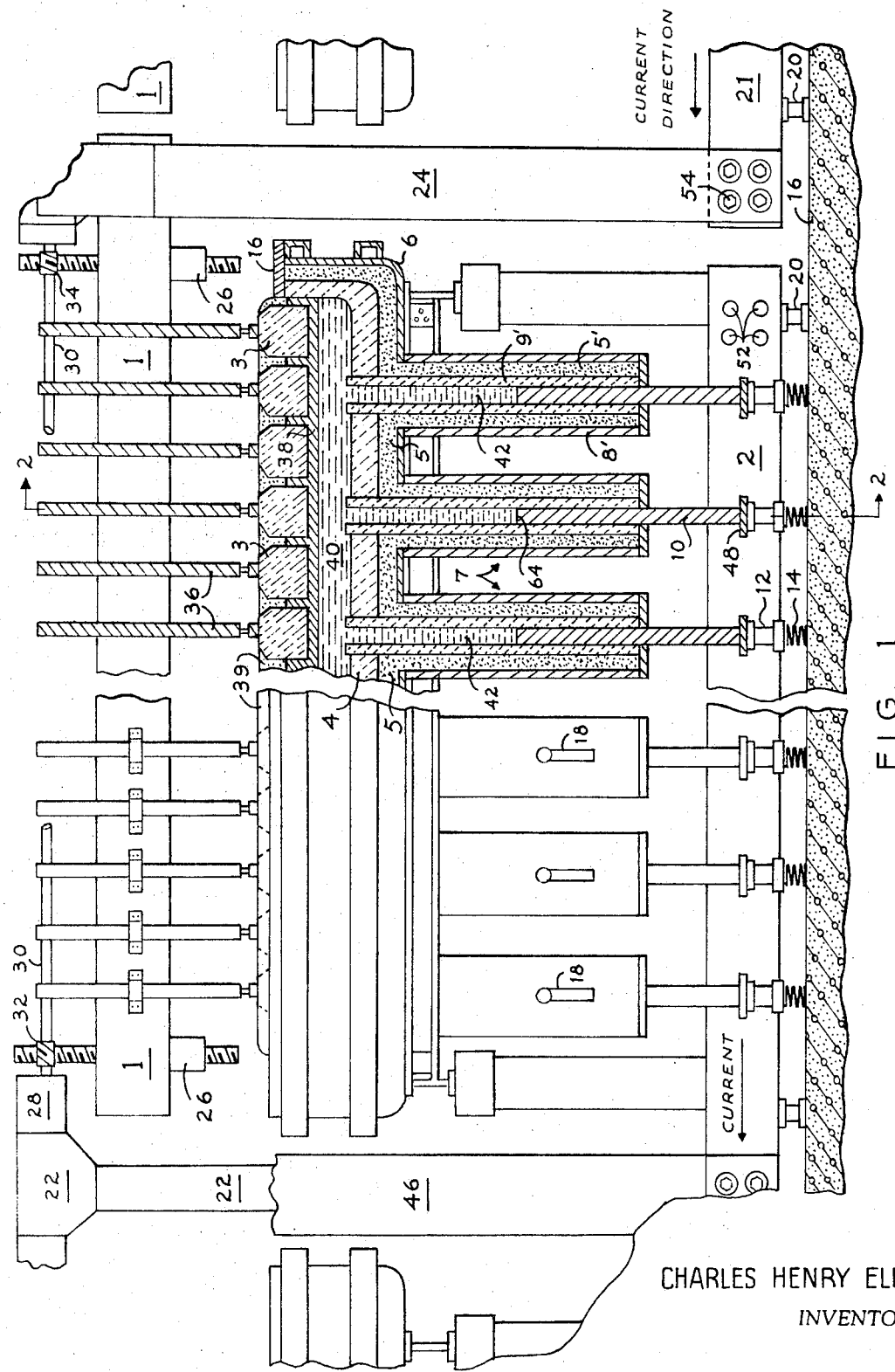
FIG. 1 is a side elevational view of one row of the upright cathode conductors of the invention, with the right half of the row broken away to show the cathodes in section along a vertical plane.

As illustrated, the invention comprises: a source of high-amperage, direct current electricity and a plurality of bus bars (for example, 1 and 2); anodes 3, supported from the bus bar 1; a carbonaceous crucible or pot lining 4 (preferably made of crushed anthracite coal, coke and petroleum pitch); insulation 5, 5' having a melting point above that of aluminum, around the crucible, preferably granular alumina, but optionally insulating brick; a crucible or pot shell 6, for instance a mild steel box, in which the insulation is held; and a plurality of upright cathodes 7, fixed to the bottom of the crucible and the pot shell, extending thru the crucible and shell and depending downward from them.

As illustrated in FIGS. 2 to 4, each of the cathodes comprises: means for supporting it in position relative to the crucible and shell (shown as comprising an outer tube 8, preferably of steel, welded or otherwise fixed to the shell 6 at a hole thru its bottom); an inner conductor-supporting means, shown as an inner hollow member or conduit 9, made of solid graphite or other solid carbon, or of other inert material having a melting point well above that of aluminum—in practice above 1,000 degrees centigrade (at such high temperatures this material of the tube is substantially immune to chemical attack by molten aluminum and cryolite): a rod-like conductor 10, of firm material that preferably is aluminum, but optionally may be of copper or a suitable current-conducting alloy, laterally supported at its upper end by the hollow member 9; means supporting the bottom of the rod-like conductor, preferably comprising yieldable means for compensating for heat-caused expansion of the conductor (shown as consisting of an electric insulator 12, of porcelain or the like, and a spring 14 between the insulator and the factory floor 16; and, optionally and preferably, a valved pipe 18, 18' for intermittent purging or tapping the molten upper part of the conductor.

The invention comprises means to control the temperature gradient from the customary 1,000 degrees centigrade, of temperature in the molten metal of the crucible 4 to approximately 100 degrees at the bus bar 2, without exceeding the maximum allowable temperature of the metal of tube 8 (preferably steel). In FIG. 2 this means comprises the relatively thick walled carbon conduit or tubular member 9 which is here shown in direct contact with the tube 8—or optionally it may be slightly spaced from this tube 8. The thickness of the carbon of 9 is calculated to cause the needed gradient of temperature. In FIG. 1, the means providing the necessary temperature gradient is obtained by structure which comprises: the hollow member or conduit 9' of graphite or other carbon; and thermal insulation 5', between the carbon conduit 9' and the tube 8. This insulation is preferably granular alumina, and is put in place at the same time as the insulation 5 is positioned. In providing for the temperature gradient of FIG. 1, the tube 8' optionally may be tapered downward from a larger diameter at or near the shell 6 to a smaller diameter at the base of the tube.

The lower bus bars are supported above the deck 16 by insulators 20, and the upper bus bars and the connected anodes are supported by a jacking system which as shown is based on concrete pedestals 22, but optionally may be insulated and supported from the pot deck 16 in a known manner. The upright, current-conducting bars 24 are fixed to the lower bus bars.

The anode-jacking means may be any known suitable jacking system. As shown in FIGS. 1 and 2, it comprises: large screwthreaded nuts 26 that are fixed inside (or on the outside) of the bar 1; a screwthreaded shaft that rotates in each of these nuts; an electric or fluid motor 28, supported by and insulated from the pedestal 22; the shaft 30 and gearing 32, 34, between the motor and the nuts 26. This jacking system simultaneously raises or lowers both ends of the bar. In operation, current flow from the lower bar 21 thru the upright conductor 24, and thence in succession thru the following elements: the bus bar 1; the anode supports 36; the anodes 3; cryolite 38, containing dissolved portions of the alumina 39; the aluminum 40 which in operation is being formed from the alumina; the molten aluminum 42 in the upper end of the hollow member or conduit 9; the solid, rod-like conductor 10; the metal pad 48; the flexible conductor 44; a lower bus bar 2; a conductor 46, by which the current is either led to another set of anodes or, in completing the circuit, to the current source. The flexible conductor 44 is shown in FIG. 2 as solid metal, but preferably it comprises a plurality of flexible, laminated leaves, as illustrated in FIG. 3. In this figure this conductor is shown as bent upward, before much expansion of the aluminum rod 10, and is flexibly free to move vertically with the conductor 10.

In the beginning of use of the type of cathode shown in FIGS. 2 to 4, the solid aluminum rod 10 is considerably longer than it is shown in these figures. While the anodes are out of the empty crucible this relatively long rod is slid downward from the crucible in a snug fit in the tube 9 until its lower end rests on the metal pad 48 and its upper end is at or near the horizontal cavity-forming surface of the crucible 4. When the rod is optionally of copper or other non-aluminum, electrically-conductive metal its upper end is originally below the inlet of the valved pipe 18 (18').

The bus bars 2 and 21 have holes (52 and those containing the bolts 54) by which switch plates may be connected between the bars, for bypassing the current around a pot or cell, for repair or maintenance.

A short, downward-extending pipe (18, 18' in FIG. 2; 56 in FIG. 4) is welded to the tube 8 and extends thru a hole at the weld to provide an occasional outlet for molten, alumina-contaminated aluminum in purging the cathode and/or a means for tapping the molten aluminum from the crucible at scheduled intervals of time. As indicated in FIG. 4, this pipe abuts a short sleeve 58, of solid graphite or other carbon and has mounted on it a valve that comprises a valve seat 60, a plug 62, and plug-actuating mechanism comprising screw 63 and a pneumatic wrench.

As illustrated, the temperature gradient between the top of each of the hollow members 9 of the pot and the bottom of the rod 10 causes a normal freeze zone 64, to be formed inside the hollow member 9, in which the aluminum changes from a molten to a solid state. Above this level undissolved alumina slowly accumulates in the liquid aluminum and causes an increase in the electrical resistance of the molten metal in the conduits 9 of the pot. When the valved pipe (18, 18', 56) is periodically used as a means of tapping the metal produced in the pot, no purging (that is limited to the conduit 9) of this mixture of aluminum and undissolved alumina is necessary.

When tapping and/or alumina sludge purging is desired, the freezing zone may be lowered by external heating, which may be accomplished by clamping to the tube 8 an electric heating element (for example a resistance heater) or by applying the flame of a blow torch to tube 8. This lowers the freezing zone 64 to an area, indicated at 65, that is below the inlet to the valved pipe; and then the valve is opened, and the desired amount of the molten aluminum is withdrawn. As indicatd in FIG. 2, the metal may be put into the member 66, which optionally may be either a transportable crucible, or an inclined trough in which the molten metal from several pots or cells is delivered by gravity to a collection center—for example a casting furnace.

Aluminum produced in the pot may be withdrawn from the top, as by siphoning, but in any event occasional purging of the hollow member 9, to remove the alumina sludge (a mixture of aluminum and the alumina) which has settled to the to the bottom of crucible 4 and to the freeze zone is necessary. Otherwise, this accumulated sludge would cause an undesired loss of electrical power and troublesome overheating of the set of tubes 8 in the pot and the valved tapping pipe. The sludge obviously accumulates only slowly in the tubular members 9 (9') because, as clearly illustrated in FIGS. 1 and 2, these members extend above the bottom of the crucible 4, with their cavities receiving sludge by its direct fall into them. In this purging a cap 67, may be placed over the top of a conduit 9, closing it, by means of the handle 68. The freeze zone is lowered, by blow torch or electrical heating, and the valve 60–63 is opened. Then the amount of sludge (molten aluminum and suspended alumina) in the hollow member 9 is withdrawn (preferably into a transportable crucible), the valve is closed and the cap 66 is removed from the pot or to another of its hollow members 9.

Determination of the proper time for this alumina-sludge purging may be according to elapsed time of use of the cathode or by meter-indicated increase of voltage drop between a point in the molten metal 40 and the bus bar 2. Or a contact pyrometer may be periodically or continually applied to the outer surface of the tube 8, to determine any above-normal temperature in this tube. The optional means for meter-indication of increased resistance is shown in FIG. 2. Here the meter 70 is connected to the molten metal pad 40 and to the bus bar 2.

The currently preferred form of the composite cathode is shown in FIG. 1. This comprises: a conductive rod 10 of the above described type; a solid graphite or other carbon hollow member 9' (the wall of which is preferably thinner than that of the member 9); an outer tube 8' (similar to 8, but of larger diameter and farther spaced from 9' than the tube 8 is spaced from 9); and thermal insulaton 5' that is described above.

METHOD OF PRODUCING ALUMINUM FROM ALUMINA

The presently disclosed method of reducing alumina comprises the following basic steps:

(1) conducting high-amperage electric current into alumina in a crucible that comprises material having a melting point well above that of aluminum and that has a hole in its lower portion;

(2) collecting a quantity of molten aluminum in an upright hollow member that comprises material having a melting point well above that of aluminum and that has a cavity opening to the said hole and sealed at its bottom against escape of molten aluminum, the said quantity having cross sections of sufficiently small areas to dissipate a sufficient amount of its heat to cause a layer of solid aluminum to form in a lower portion of the said member; and (3) conducting electric current from molten aluminum in the said crucible thru the said quantity of molten aluminum in the hollow member and thence thru a conductor of firm material that has an end in contact with the said quantity.

More specifically, in further detail, the invented method comprises the following steps: (1) placing solid, metallic, conductive rods (10) in substantially vertical, carbonaceous hollow members that depend from a crucible shell and closing off at least the bottom parts of the hollow members by the rods; (2) fastening (welding) the base of each rod to an electrically-conductive rod support; (3) installation of anodes on the upper bus bar; (4) pouring into a crucible that comprises carbonaceous materials sufficient molten aluminum to immerse the upper ends of the conductive rods and the carbonaceous conduits that sheath the rods; (5) lowering the anodes into the molten aluminum; (6) applying high-amperage current via the anodes into the molten aluminum and thence downward thru a layer of the molten aluminum in each hollow member thru the substantially vertical rods to current-conducting means located below the said crucible, shell, and hollow members; (7) after sufficient application of the high-amperage current to raise the temperature of the contents of the crucible to a point well above the melting point of aluminum (preferably, to approximately 1,000 degrees centigrade), placing into the crrucible sufficient cryolite (38) to form a substantial, floating layer over the molten aluminum; (8) raising the anodes until they are above the molten aluminum and at least in part surrounded by the cryolite; (9) blanketing over the cryolite a substantial layer of granular alumina; (10) recurrently removing molten aluminum from the crucible; and (11) moving the molten aluminum of step (10) to another location.

In the above-described detailed method, step (11) optionally may comprise: collecting the molten aluminum in a transportable container; or catching the drained molten metal in an upper portion of an inclined trough or channel and conveying the metal to said location by gravity. Optionally and preferably, between steps (9) and (10), the following step may be included in the method: (9A) lowering the freeze zone (64), in which metal in each of the said hollow members changes from an upper molten state to a lower solid state, to an area at or below the outlet from the hollow member via which the molten metal is tapped in step (10). And optionally also between steps (9) and (10), and before step (9A), the following steps may be included: ascertaining the temperature gradient between the metal at or near the top of the said conduits and the metal of an electrical bus bar below the conduits; and, in preparing to purge the hollow member (9 or 9'), placing a cap over the upper end of the hollow member.

I claim:

1. Apparatus for the production of aluminum from alumina, comprising:

a crucible of material having a melting point above that of aluminum, adapted to hold molten aluminum and alumina, said crucible having at least one aperture in its bottom wall;

a crucible-supporting shell of metal, having a bottom wall and at least one hole in this wall;

thermal insulation between said crucible and shell;

at least one tubular member of material having a melting point above 1,000 degrees C., having an upper end portion attached to said crucible at said aperture, and extending thru and below said hole;

at least one strength-providing tube of material having a melting point below that of alumina, surrounding and bracing at least a major portion of said tubular member, having an upper end below said bottom of the crucible and attached to said shell at said hole;

anode means for conducting alumina-heating current into the said crucible;

a source of electric current, connected to said anode means;

means for conducting electric current out of said crucible, comprising: an electrical conductor of material comprising solid aluminum, sealingly mounted in said tubular member, having an upper solid end that during said production is below the bottom of said crucible; said conductor during aluminum production comprising molten aluminum in the upper end of said tubular member;

electrically-conductive means directly connected to said electrical conductor and connected to said source of current and to said anode means; and tapping means, exposed to ambient air, extending thru the side wall of said tubular member with its hollow space normally opening thru a sidewall aperture in said tubular member opposite a portion of said solid aluminum, said tapping means during aluminum production being sufficiently near to the top of said solid end to permit melting of said portion and draining of aluminum thru the tapping means and tubular member, by application of heat to the tapping means.

2. Apparatus for the production of refined aluminum by the reduction of ore heated to a temperature well above the melting point of said aluminum, comprising:

a crucible, adapted to hold molten aluminum and its ore;

a hollow member of material having a melting point above the said temperature, extending thru said crucible and projecting above its bottom, having an upright axis, and in the operation of the apparatus having a cavity opening to the crucible above its bottom, during said production accumulating a small amount of alumina sludge by its fall into said cavity;

anode means for conducting said ore-heating electric current into the said crucible;

conductive means for electrically connecting said anode means to said source; means for conducting the said ore-heating electric current out of the crucible, comprising, during said operation, molten aluminum in an upper part of said hollow member and a solid-aluminum electrical conductor, sealingly mounted in said hollow member, having an upper end that in the said operation is in contact with said molten aluminum below a bottom portion of the crucible, forming a sealing bottom wall of said cavity;

means for conveying said ore-heating current from said electrical conductor, completing a circuit for said current, comprising electricity-conducting means, directly connected to said conductor, free of electrically-conductive attachment to said hollow member, electrically connected to said conductive means; and means for removal of said accumulated small amount of sludge from said hollow member.

3. Apparatus as set forth in claim 2, in which said sludge-removal means comprises a tubular element and a valve on said element.

4. Apparatus as set forth in claim 2, in which: the said cavity extends downward from the said crucible to and thru the bottom of said hollow member; the said conductor snugly fits against walls of a lower portion of the cavity and has a part extending below the tubular member; and the said means for conveying electric current is connected to the said part of the conductor.

5. Apparatus as set forth in claim 2, in which the said hollow member is tubular and hollow from its top to its bottom and comprises carbonaceous material, and the said solid aluminum substantially seals the bottom of said cavity against escape of molten aluminum.

6. Apparatus as set forth in claim 2, comprising thermal insulation between said tube and tubular member.

7. Apparatus as set forth in claim 6, in which the said insulation between the tube and hollow member comprises granular alumina.

8. Apparatus as set forth in claim 2, in which the apparatus further comprises resilient means for supporting the lower end of the said conductor.

9. Apparatus as set forth in claim 1, in which the said hollow member is of carbonaceous material, and the said apparatus further comprises a tube of metal, surrounding the said hollow member.

10. Apparatus as set forth in claim 2, in which said electrical conductor comprises a solid-metal rod extending below the lower end of the said hollow member.

11. Apparatus as set forth in claim 2, comprising a shell around a major portion of said crucible, heat-insulating material between said shell and crucible; in said apparatus: said hollow member is attached to said crucible at an aperture in its bottom; said hollow member comprises carbonaceous material and extends sufficiently below said crucible during said operation to air cool a lower portion of the molten metal inside the hollow member; and the apparatus further comprises: a metal tube, surrounding an upper portion of said hollow member, attached to a bottom portion of said shell at a hole in it; and thermal insulation between said tube and hollow member.

12. Apparatus as set forth in claim 2, comprising a tube around said member and thermal insulation between the said tube and hollow member.

References Cited

UNITED STATES PATENTS

| | | | |
|---|---|---|---|
| 469,454 | 2/1892 | Rogers | 204—245 |
| 3,502,553 | 3/1970 | Gruber | 204—67 |
| 3,508,908 | 4/1970 | Herwig et al. | 204—67 X |
| 3,607,685 | 9/1971 | Johnson | 204—67 |
| 3,470,083 | 9/1969 | Wrigge et al. | 204—243 R |

FOREIGN PATENTS

| | | | |
|---|---|---|---|
| 7,426 | 4/1888 | Great Britain | 204—67 |

JOHN H. MACK, Primary Examiner

D. R. VALENTINE, Assistant Examiner

U.S. Cl. X.R.

204—245